(12) United States Patent
Luan et al.

(10) Patent No.: US 7,962,336 B2
(45) Date of Patent: Jun. 14, 2011

(54) METHOD AND APPARATUS FOR ENROLLMENT AND EVALUATION OF SPEAKER AUTHENTIFICATION

(75) Inventors: Jian Luan, Don Cheng District (CN); Jie Hao, Don Cheng District (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 922 days.

(21) Appl. No.: 11/859,358

(22) Filed: Sep. 21, 2007

(65) Prior Publication Data

US 2008/0082331 A1     Apr. 3, 2008

(30) Foreign Application Priority Data

Sep. 29, 2006   (CN) .......................... 2006 1 0141241

(51) Int. Cl.
*G10L 15/00* (2006.01)
(52) U.S. Cl. ........................................ 704/241; 704/246
(58) Field of Classification Search .................. 704/241, 704/246
See application file for complete search history.

(56) References Cited

U.S. PATENT DOCUMENTS

| | | | | |
|---|---|---|---|---|
| 4,783,802 A * | 11/1988 | Takebayashi et al. | ........ | 704/243 |
| 5,604,839 A * | 2/1997 | Acero et al. | .................. | 704/234 |
| 5,839,103 A * | 11/1998 | Mammone et al. | ........... | 704/232 |
| 6,349,280 B1 * | 2/2002 | Hattori | ........................... | 704/250 |
| 6,922,668 B1 * | 7/2005 | Downey | ........................ | 704/246 |
| 2004/0236573 A1 * | 11/2004 | Sapeluk | ........................ | 704/224 |
| 2007/0100608 A1 * | 5/2007 | Gable et al. | ................... | 704/209 |

FOREIGN PATENT DOCUMENTS

CN          1247363 A       3/2000

* cited by examiner

*Primary Examiner* — Daniel D Abebe

(74) *Attorney, Agent, or Firm* — Oblon, Spivak, McClelland, Maier & Neustadt, L.L.P.

(57) ABSTRACT

The present invention provides a method and apparatus for enrollment and evaluation of speaker authentication. The method for enrollment of speaker authentication, comprising: generating a plurality of acoustic feature vector sequences respectively based on a plurality of utterances of the same content spoken by a speaker; generating a reference template from said plurality of acoustic feature vector sequences; generating a corresponding pseudo-impostor feature vector sequence for each of said plurality of acoustic feature vector sequences based on a code book that includes a plurality of codes and their corresponding feature vectors; and selecting an optimal acoustic feature subset based on said plurality of acoustic feature vector sequences, said reference template and said plurality of pseudo-impostor feature vector sequences.

20 Claims, 6 Drawing Sheets

METHOD AND APPARATUS FOR ENROLLMENT AND EVALUATION OF SPEAKER AUTHENTIFICATION

CROSS-REFERENCE TO RELATED APPLICATION

This application is based upon and claims the benefit of priority from prior Chinese Patent Application No. 200610141241.3, filed on Sep. 29, 2006; the entire contents of which are incorporated herein by reference.

FIELD OF THE INVENTION

The present invention relates to the information processing technique, particularly to a speaker authentication technique.

BACKGROUND OF THE INVENTION

Different speakers can be recognized based on the utterance characteristics of each speaker when he/she is speaking, thus speaker authentication can be conducted. Such three common speaker recognition engine techniques as HMM, DTW (Dynamic Time Warping) and VQ are introduced in K. Yu, J. Mason, J. Oglesby, "Speaker recognition using hidden Markov models, dynamic time warping and vector quantisation" (Vision, Image and Signal Processing, IEE Proceedings, Vol. 142, October 1995, pp. 313-18).

Usually, the process of speaker authentication includes an enrollment phase and a verification phase. In the enrollment phase, a speaker template of a speaker (user) is generated according to the utterance containing a password spoken by the speaker himself; and the in the verification phase, it is determined whether a test utterance is one containing the same password spoken by the speaker himself based on the speaker template. Thus, the quality of the speaker template is very important to the whole authentication process.

For a DTW-based speaker verification system, a number of features are required as input of each frame for reliable performance. In general, these features are extracted from all the speakers in the same way and the specialty of each speaker is neglected. Some schemes have been proposed to customize optimal feature sets for each speaker by choosing proper feature subset from the acoustic feature set. By this method, verification performance can be improved as well as the memory requirement for template is reduced. However, the effective criterion for feature selection is a puzzle, especially when available information is limited.

A known optimization method can be specified in terms of two components: a performance criterion and a search procedure. For the first component, usual performance criterion demands an impostor database e.g. False Accept Rate is used as the performance criterion in B. Sabac (2002): "Speaker recognition using discriminative features selection" in ICSLP-2002, pp. 2321-2324. That is to say, we need test the performance of different feature subsets with a great number of client trials and impostor trials so as to find the optimal one. However, impostor data are seldom available in a password-selectable speaker verification system.

SUMMARY OF THE INVENTION

In order to solve the existing problem in the prior art, the present invention provides a method and apparatus for enrollment of speaker authentication, and a method and apparatus for verification of speaker authentication.

According to an aspect of the present invention, there is provided a method for enrollment of speaker authentication, comprising: generating a plurality of acoustic feature vector sequences respectively based on a plurality of utterances of the same content spoken by a speaker; generating a reference template from the plurality of acoustic feature vector sequences; generating a corresponding pseudo-impostor feature vector sequence for each of the plurality of acoustic feature vector sequences based on a code book that includes a plurality of codes and their corresponding feature vectors; and selecting an optimal acoustic feature subset based on the plurality of acoustic feature vector sequences, the reference template and the plurality of pseudo-impostor feature vector sequences.

According to another aspect of the present invention, there is provided a method for verification of speaker authentication, comprising: generating a testing acoustic feature vector sequence from a testing utterance; optimizing the testing acoustic feature vector sequence based on an optimal acoustic feature subset generated during enrollment to obtain an optimal testing acoustic feature vector sequence; and determining whether the testing utterance is an enrolled utterance spoken by the same speaker based on a reference template and the optimal testing acoustic feature vector sequence.

According to another aspect of the present invention, there is provided an apparatus for enrollment of speaker authentication, comprising: an acoustic feature extracting unit configured to generate a acoustic feature vector sequence from an utterance spoken by a speaker; a template generating unit configured to generate a reference template from a plurality of acoustic feature vector sequences corresponding to a plurality of utterances of the same content spoken by a speaker; a pseudo-impostor data generating unit configured to generate a corresponding pseudo-impostor feature vector sequence for each of the plurality of acoustic feature vector sequences based on a code book that includes a plurality of codes and their corresponding feature vectors; and an optimizing unit configured to select an optimal acoustic feature subset based on the plurality of acoustic feature vector sequences, the reference template and the plurality of pseudo-impostor feature vector sequences.

According to another aspect of the present invention, there is provided an apparatus for verification of speaker authentication, comprising: a testing acoustic feature extracting unit configured to generate a testing acoustic feature vector sequence from a testing utterance; a testing optimizing unit configured to optimize the testing acoustic feature vector sequence based on an optimal acoustic feature subset generated during enrollment to obtain an optimal testing acoustic feature vector sequence; and a determining unit configured to determine whether the testing utterance is an enrolled utterance spoken by the same speaker based on a reference template and the optimal testing acoustic feature vector sequence.

DETAILED DESCRIPTION OF THE EMBODIMENTS

Figure 1:
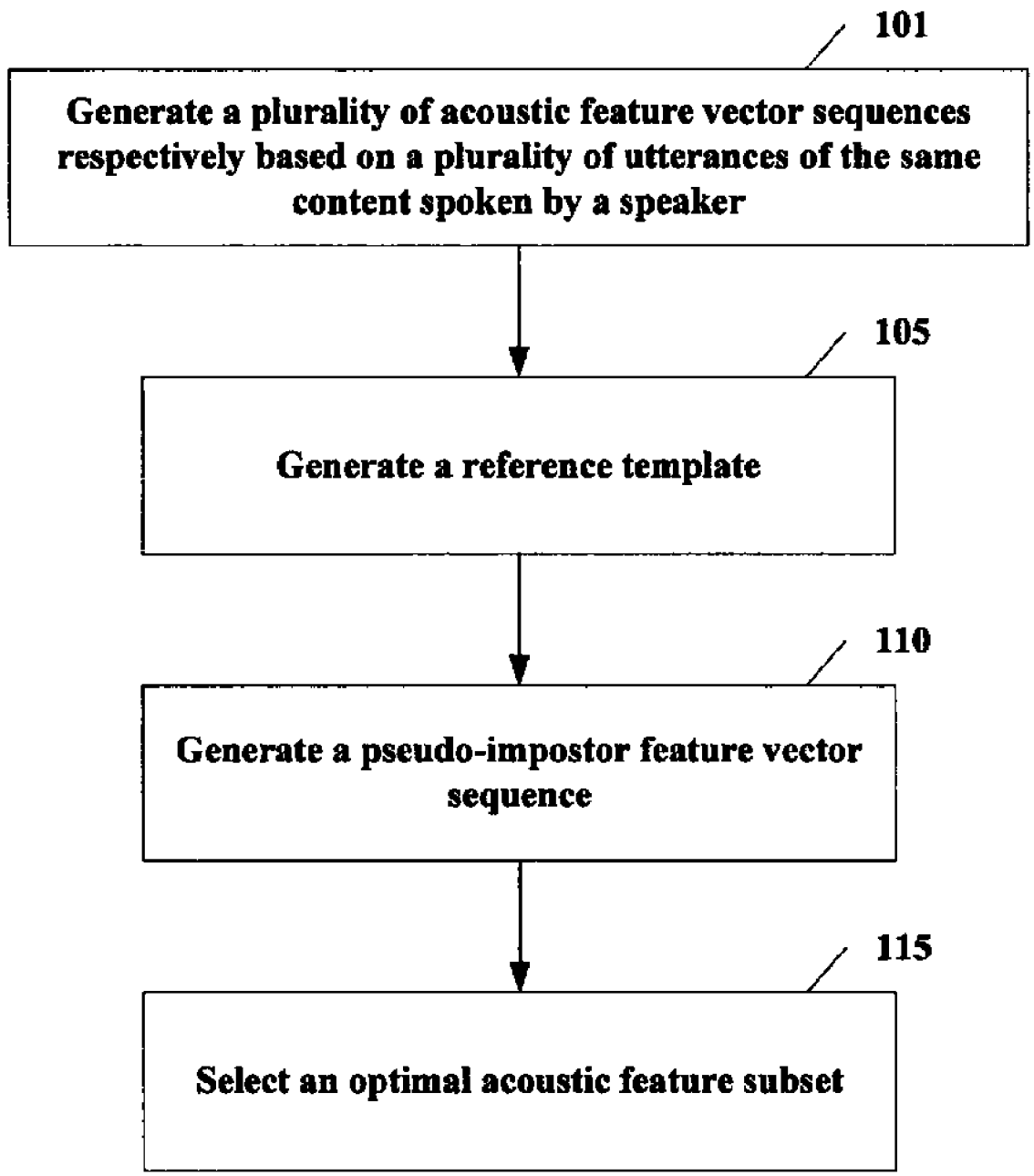
FIG. 1 is a flowchart of a method for enrollment of speaker authentication according to an embodiment of the present invention.

The preferred embodiments of the present invention will be described in detail below in conjunction with the drawing.

FIG. 1 is a flowchart of a method for enrollment of speaker authentication according to an embodiment of the present invention. As shown in FIG. 1, first in step 101, a plurality of acoustic feature vector sequences are generated respectively based on a plurality of utterances of the same content spoken by a speaker. Each acoustic feature vector may contain, for example, a plurality of acoustic features indicating utterances in the form of MFCC (Mel Frequency Cepstrum Coefficient). But the present invention does not have a special limitation to this, and the acoustic feature of an utterance can be represented by using other known and future modes, such as LPCC (Linear Predictive Cepstrum Coefficient) or other coefficients obtained based on energy, fundamental tone frequency or wavelet analysis, etc., such information as pitch and duration, and their first differentials and second differentials on a time axis, and so on. All features thought to be suitable for speaker recognition can be merged to act as a feature set. Then, by using a feature selection method described later, an optimal feature subset is customized for a speaker by choosing features from the feature set automatically with respect to the specialty of each speaker in the enrollment process.

Next in step 105, a reference template is generated from the plurality of acoustic feature vector sequences. For example, first an acoustic feature vector sequence is selected to be an initial template, then a second acoustic feature vector sequence is made to align with it in time by using a DTW method, and a new template is generated by using the average of the corresponding feature vectors in the two acoustic feature vector sequences. Then a third acoustic feature vector sequence is made to align with the new template in time, and such an circulation is conducted until all the acoustic feature vector sequences are merged into an independent template, i.e. so called template merging. Refer to W. H. Abdulla, D. Chow and G. Sin, "Cross-words reference template for DTW-based speech recognition systems" (IEEE TENCON 2003, pp. 1576-1579) for the detail content. It should be pointed out that the present invention does not have a special limitation to the mode for generating a reference template.

Next in step 110, a corresponding pseudo-impostor feature vector sequence for each of the plurality of acoustic feature vector sequences is generated based on a code book. The code book used in the present embodiment is one trained in the acoustic space of a whole application. For example, for a Chinese language application environment, the code book needs to cover the acoustic space of Chinese utterances; and for an English language application environment, the code book needs to cover the acoustic space of English utterances. Of course, for some special application environments, the acoustic space covered by the code book can be changed correspondingly.

The code book of the present embodiment contains a lot of codes and their corresponding feature vectors. The number of the codes depends on the size of the acoustic space, desired compression ratio and desired compression quality. The greater the acoustic space is, the more the number of the needed codes is. Under a condition of a same acoustic space, the less the number of the codes is, the higher the compression ratio is, and the more the number of the codes is, the higher the quality of the compressed template is. According to a preferred embodiment of the present invention, under an acoustic space of common Chinese utterances, the number of the codes is preferably 256-512. Of course, according to different needs, the number of the codes and the covered acoustic space of the code book can be adjusted appropriately.

Specifically, in this step, first, a code is designated to each feature vector in the acoustic feature vector sequence to translate the acoustic feature vector sequence into a corresponding code sequence. For example, a feature vector closest to a feature vector of an acoustic feature vector sequence can be found by calculating the distance (such as the Euclidean distance) between the feature vector of the acoustic feature vector sequence and each feature vector in the code book. A code corresponding to the closest feature vector in the code book is designated to the feature vector of the acoustic feature vector sequence.

Then the code sequence is translated into a corresponding feature vector sequence based on the codes and their corresponding feature vectors of the code book, as the pseudo-impostor feature vector sequence.

Next in step 115, an optimal acoustic feature subset is selected based on the plurality of acoustic feature vector sequences, the reference template and the plurality of pseudo-impostor feature vector sequences. Specifically, each possible acoustic feature subset is traversed, and the acoustic feature subset that maximizes the discriminative rate of the reference template relative to the pseudo-impostor feature vector sequence is selected as the optimal acoustic feature subset.

According to an embodiment of the present invention, according to each possible acoustic feature subset, a plurality of DTW distances de(i) (called an intra-speaker distance) between the reference template and the plurality of acoustic feature vector sequences, and a plurality of DTW distances dp(i) (called an inter-speaker distance) between the reference template and the plurality of pseudo-impostor feature vector sequences are calculated, respectively. The acoustic feature subset that minimizes the ratio of the plurality of DTW distances de(i) between the reference template and the plurality of acoustic feature vector sequences to the plurality of DTW distances dp(i) between the reference template and the plurality of pseudo-impostor feature vector sequences is selected as the optimal acoustic feature subset.

According to another embodiment of the present invention, according to each possible acoustic feature subset, a plurality of DTW distances de(i) between the reference template and the plurality of acoustic feature vector sequences, and a plurality of DTW distances dp(i) between the reference template and the plurality of pseudo-impostor feature vector sequences are calculated, respectively. The acoustic feature subset that minimizes the ratio of the difference between the plurality of DTW distances de(i) between the reference template and the plurality of acoustic feature vector sequences and the plurality of DTW distances dp(i) between the reference template and the plurality of pseudo-impostor feature vector sequences to the sum of the plurality of DTW distances de(i) between the reference template and the plurality of acoustic feature vector sequences and the plurality of DTW distances dp(i) between the reference template and the plurality of pseudo-impostor feature vector sequences is selected as the optimal acoustic feature subset.

In addition, according to an embodiment of the present invention, the step of traversing each possible acoustic feature subset is performed in a specific range. For example, the specific range includes possible acoustic feature subsets in which the number of acoustic features is greater than a specific number.

It can be seen from the above description that the method for enrollment of speaker authentication according to the present embodiment can select an optimal acoustic feature subset in case that there is no imposer database, by which, the extracted features will be more discriminatory. Employing the technique, a text-dependent speaker verification system achieves remarkable improvement.

Figure 2:
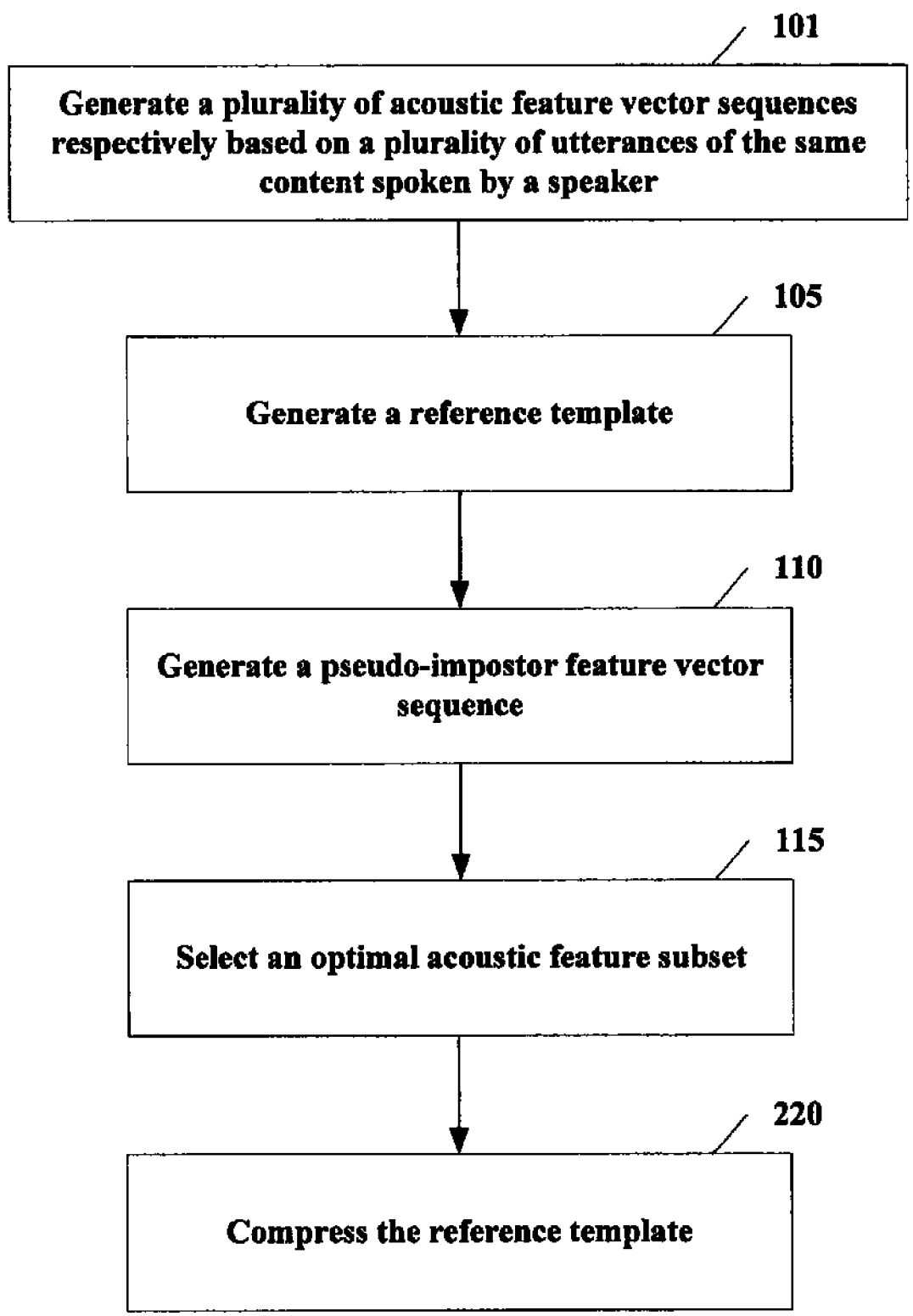
FIG. 2 is a flowchart of a method for enrollment of speaker authentication according to another embodiment of the present invention.

FIG. 2 is a flowchart of a method for enrollment of speaker authentication according to another embodiment of the present invention. The embodiment will be described below in conjunction with the figure. For the parts identical to those of the previous embodiment, their descriptions will be omitted properly.

As shown in FIG. 2, the steps 101-115 of the method for enrollment of speaker authentication according to the present embodiment are identical to the embodiment shown in FIG. 1, which will not be repeated again here.

Compared to the previously described embodiment, the present embodiment further comprises step 220 for compressing the reference template. Specifically, it may comprises compressing the dimension of acoustic feature vectors in the reference template based on the optimal acoustic feature subset; or compressing the number of acoustic feature vectors in the reference template based on the code book.

For the mode for compressing the number of acoustic feature vectors in the reference template based on the code book, please refer to Chinese patent application No. 200510115300.5 (entitled "apparatus and method for compressing and merging speaker templates and speaker authentication") filed by the present applicant on Nov. 11, 2005. A plurality of adjacent features in the reference template which have identical specific codes is replaced with a feature vector. For example, first, the average vector of the above set of adjacent feature vectors having identical codes is computed. Then the calculated average vector is used to replace the above set of adjacent feature vectors having identical codes.

If there exist a plurality of sets of such a plurality of adjacent features having identical codes in the reference template, then they can be replaced one by one in the above mode. Thus the plurality of feature vectors are replaced with one feature vector one by one, the number of the feature vectors in the reference template is reduced, and thus the template is compressed.

It can be seen from the above description that the method for enrollment of speaker authentication according to the present embodiment can not only select an optimal acoustic feature subset in the case that there is no imposer database, but also correspondingly compress the reference template. Thus, the storage requirement for template is cut down. Meanwhile, the computation burden is also reduced. Employing the technique, a text-dependent speaker verification system achieves remarkable improvement.

Figure 3:
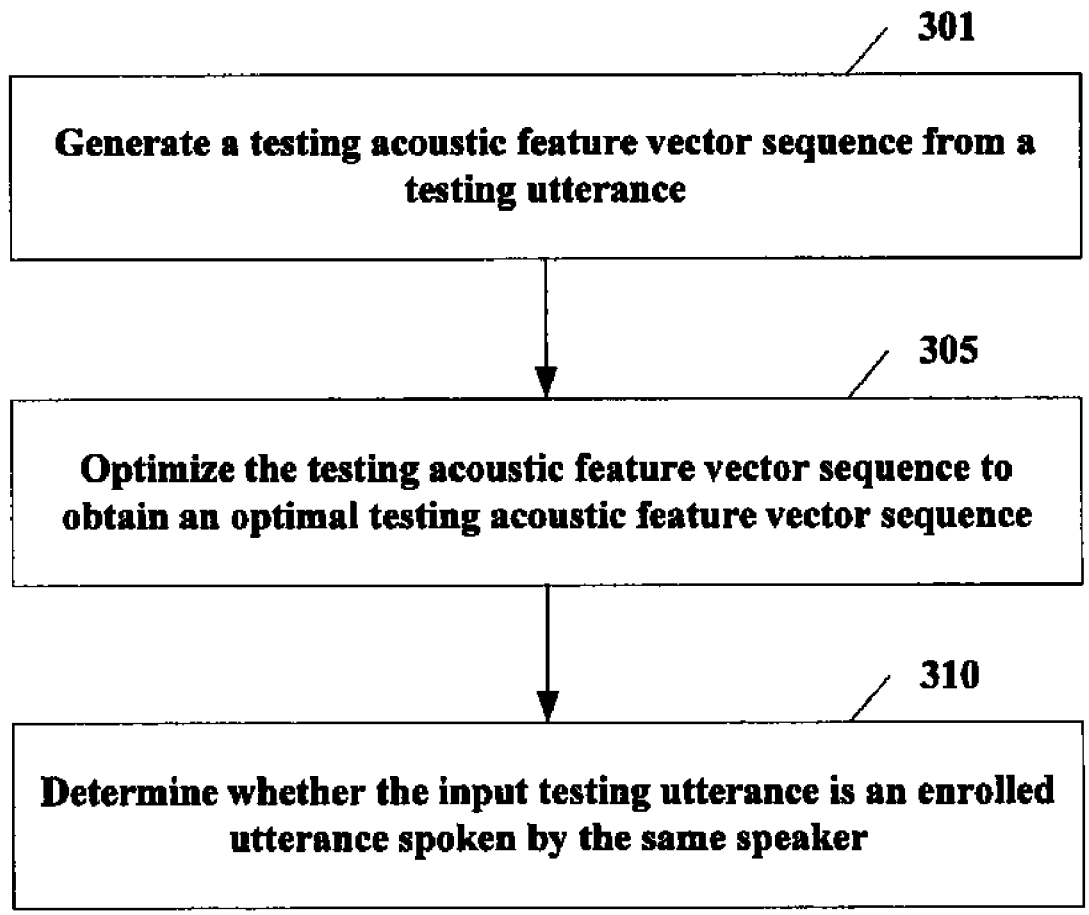
FIG. 3 is a flowchart of a method for verification of speaker authentication according to an embodiment of the present invention.

Under a same inventive concept, FIG. 3 is a flowchart of a method of verification of speaker authentication according to an embodiment of the present invention. The embodiment will be described below in conjunction with the figure. For the parts identical to those of the previous embodiment, their descriptions will be omitted properly.

As shown in FIG. 3, first in step 301, a test acoustic feature vector sequence is generated according to a test utterance. Similar to the step 101 of FIG. 1 described previously, each acoustic feature vector can contain, for example, a plurality of acoustic features indicating utterances in the form of MFCC (Mel Frequency Cepstrum Coefficient). But the present invention does not have a special limitation to this, and the acoustic feature of an utterance can be represented by using other known and future modes, such as LPCC (Linear Predictive Cepstrum Coefficient) or other coefficients obtained based on energy, fundamental tone frequency or wavelet analysis, etc., such information as pitch and duration, and their first differentials and second differentials on a time axis, and so on. All features thought to be suitable for speaker recognition can be merged to act as a feature set.

Next in step 305, the testing acoustic feature vector sequence is optimized based on an optimal acoustic feature subset generated during enrollment to obtain an optimal testing acoustic feature vector sequence. How to select an optimal acoustic feature subset has been described in the previous embodiment, and will not be repeated again here.

Next in step 310, it is determined whether the testing utterance is an enrolled utterance spoken by the same speaker based on a reference template and the optimal testing acoustic feature vector sequence. Specifically, for example, first, a DTW matching score between the reference template and the optimal testing acoustic feature vector sequence is calculated; and then the DTW matching score is compared with a threshold to determine whether the input utterance is an enrolled utterance spoken by the same speaker.

It should be pointed out that all known and future modes for calculating a DTW matching score between the reference template and the optimal testing acoustic feature vector sequence are applicable for the present invention. And all known and future modes for setting a distinguish threshold are applicable for the present invention.

It can be seen from the above description that the method for validation of speaker authentication according to the present embodiment can use an optimal acoustic feature set selected in the enrollment phase, by which, the extracted features will be more discriminatory and the system achieves remarkable improvement.

Figure 4:
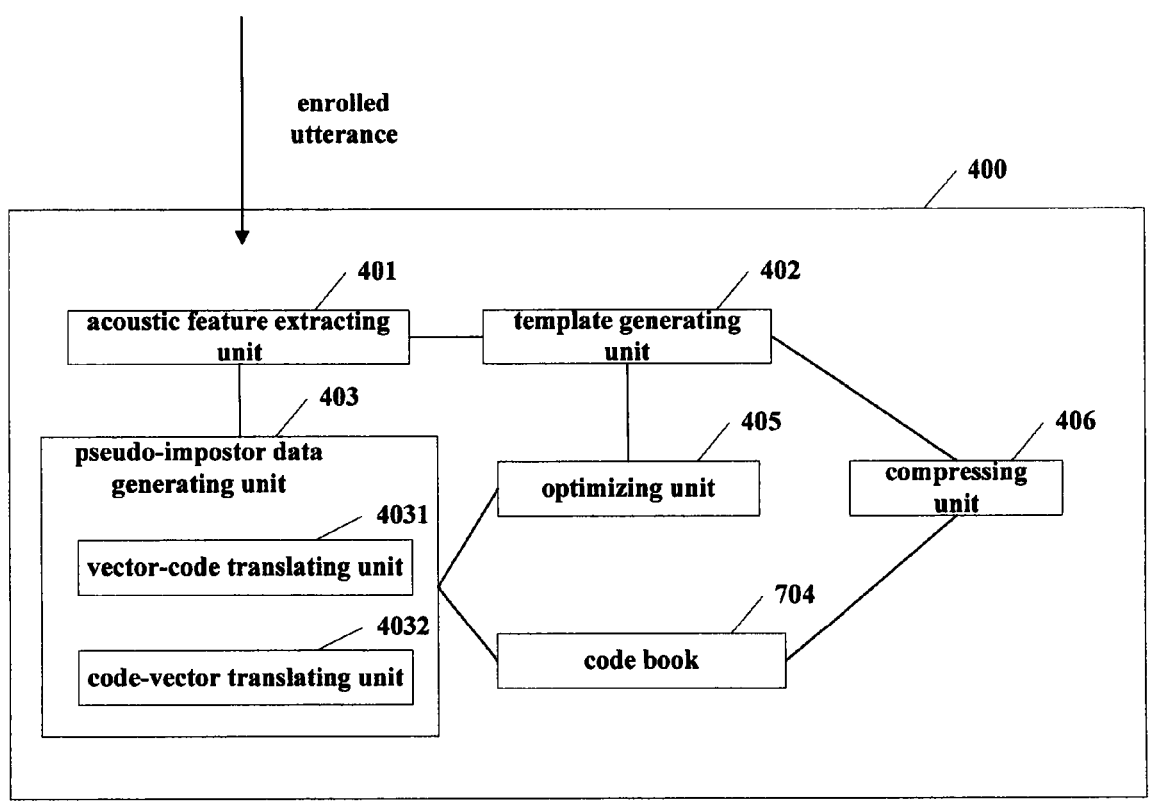
FIG. 4 is a block diagram of an apparatus for enrollment of speaker authentication according to an embodiment of the present invention.

Under a same inventive concept, FIG. 4 is a block diagram of an apparatus for enrollment of speaker authentication according to an embodiment of the present invention. The embodiment will be described below in conjunction with FIG. 4. For the parts identical to those of the previous embodiment, their descriptions will be omitted properly.

As shown in FIG. 4, the apparatus 400 for enrollment of speaker authentication, comprising: an acoustic feature extracting unit 401 configured to generate a acoustic feature vector sequence from an utterance spoken by a speaker; a template generating unit 402 configured to generate a reference template from a plurality of acoustic feature vector sequences corresponding to a plurality of utterances of the same content spoken by a speaker; a pseudo-impostor data generating unit 403 configured to generate a corresponding pseudo-impostor feature vector sequence for each of the plurality of acoustic feature vector sequences based on a code book 704 that includes a plurality of codes and their corresponding feature vectors; and an optimizing unit 405 configured to select an optimal acoustic feature subset based on the plurality of acoustic feature vector sequences, the reference template and the plurality of pseudo-impostor feature vector sequences.

The pseudo-impostor data generating unit 403 comprises a vector-code translating unit 4031 configured to designate a code to each feature vector in the acoustic feature vector sequence, to translate the acoustic feature vector sequence into a corresponding code sequence; and a code-vector translating unit 4032 configured to translate the code sequence into a corresponding feature vector sequence based on the codes and their corresponding feature vectors, as the pseudo-impostor feature vector sequence.

According to an embodiment of the present invention, the vector-code translating unit 4031 is configured to search the code book for a feature vector closest to the feature vector of the acoustic feature vector sequence, and designate a code corresponding to the closest feature vector in the code book to the feature vector of the acoustic feature vector sequence.

According to an embodiment of the present invention, the optimizing unit 405 is configured to traverse each possible acoustic feature subset, and select the acoustic feature subset that maximizes the discriminative rate of the reference template relative to the pseudo-impostor feature vector sequence as the optimal acoustic feature subset.

According to another embodiment of the present invention, the optimizing unit 405 is configured to traverse each possible acoustic feature subset; calculate a plurality of DTW distances de(i) (called an intra-speaker distance) between the reference template and the plurality of acoustic feature vector sequences, and a plurality of DTW distances dp(i) (called an inter-speaker distance) between the reference template and the plurality of pseudo-impostor feature vector sequences respectively; and select the acoustic feature subset that minimizes the ratio of the plurality of DTW distances de(i) between the reference template and the plurality of acoustic feature vector sequences to the plurality of DTW distances dp(i) between the reference template and the plurality of pseudo-impostor feature vector sequences as the optimal acoustic feature subset.

According to another embodiment of the present invention, the optimizing unit 405 is configured to traverse each possible acoustic feature subset; calculate a plurality of DTW distances de(i) between the reference template and the plurality of acoustic feature vector sequences, and a plurality of DTW distances dp(i) between the reference template and the plurality of pseudo-impostor feature vector sequences respectively; and select the acoustic feature subset that minimizes the ratio of the difference between the plurality of DTW distances de(i) between the reference template and the plurality of acoustic feature vector sequences and the plurality of DTW distances dp(i) between the reference template and the plurality of pseudo-impostor feature vector sequences to the sum of the plurality of DTW distances de(i) between the reference template and the plurality of acoustic feature vector sequences and the plurality of DTW distances dp(i) between the reference template and the plurality of pseudo-impostor feature vector sequences as the optimal acoustic feature subset.

According to another embodiment of the present invention, the optimizing unit 405 is configured to traverse each possible acoustic feature subset in a specific range. For example, the specific range includes possible acoustic feature subsets in which the number of acoustic features is greater than a specific number.

As shown in FIG. 4, the apparatus 400 for enrollment of speaker authentication further comprises a compressing unit 406 configured to compress the dimension of acoustic feature vectors in the reference template based on the optimal acoustic feature subset.

According to another embodiment of the present invention, the compressing unit 406 is configured to further compress the number of acoustic feature vectors in the reference template based on the code book.

It can be seen from the above description that apparatus for enrollment of speaker authentication according to the present embodiment can implement the method for enrollment of speaker authentication described in the previous embodiment in operation, and can select an optimal acoustic feature subset in the case that there is not imposter database, by which, the extracted features will be more discriminatory. Employing the technique, a text-dependent speaker verification system achieves remarkable improvement.

In addition the reference template is compressed correspondingly, cutting down the storage requirement for template. Meanwhile, the computation burden is also reduced.

Figure 5:
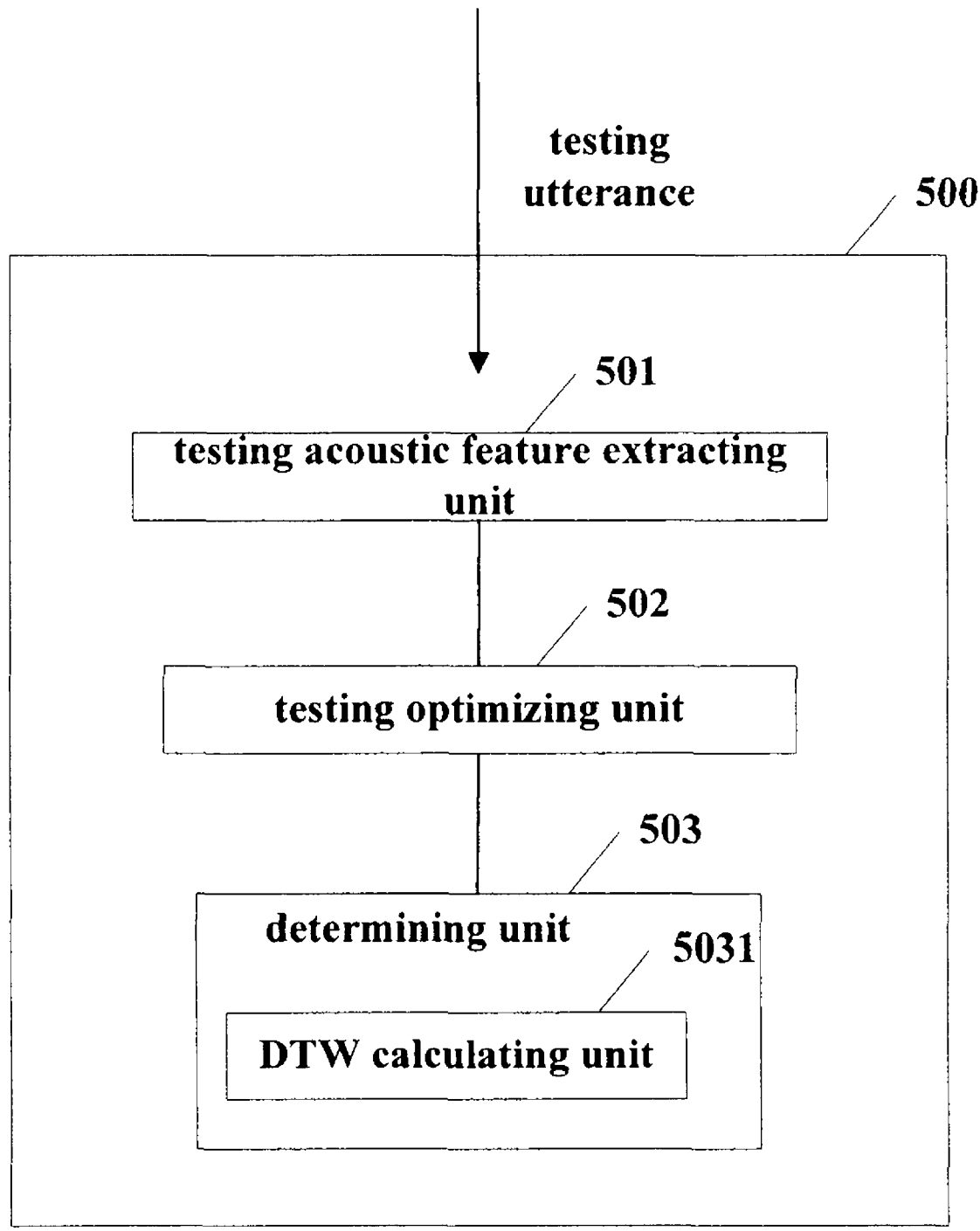
FIG. 5 is a block diagram of an apparatus for verification of speaker authentication according to an embodiment of the present invention.

Under a same inventive concept, FIG. 5 is a block diagram of an apparatus for verification of speaker authentication according to an embodiment of the present invention. The embodiment will be described below in conjunction with FIG. 5. For the parts identical to those of the previous embodiment, their descriptions will be omitted properly.

As shown in FIG. 5, an apparatus 500 for verification of speaker authentication according to the present embodiment comprises a testing acoustic feature extracting unit 501 configured to generate a testing acoustic feature vector sequence from a testing utterance; a testing optimizing unit 502 configured to optimize the testing acoustic feature vector sequence based on an optimal acoustic feature subset generated during enrollment to obtain an optimal testing acoustic feature vector sequence; and a determining unit 503 configured to determine whether the testing utterance is an enrolled utterance spoken by the same speaker based on a reference template and the optimal testing acoustic feature vector sequence.

The determining unit comprises: a DTW calculating unit 5031 configured to calculate a DTW matching score between the reference template and the optimal testing acoustic feature vector sequence. The determining unit 503 is configured to compare the DTW matching score with a threshold to determine whether the testing utterance is an enrolled utterance spoken by the same speaker.

It can be seen from the above description that apparatus for verification of speaker authentication according to the present embodiment can implement the method for verification of speaker authentication described in the previous embodiment in operation, and can select an optimal feature set according the characteristics of each speaker by using an optimal acoustic feature subset selected in the enrollment phase, by which, the extracted features will be more discriminatory. The system achieves remarkable improvement.

Figure 6:
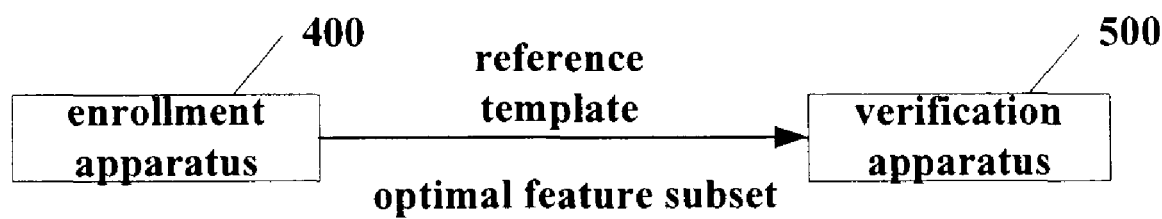
FIG. 6 is a block diagram of a speaker authentication system according to an embodiment of the present invention.

Under a same inventive concept, FIG. 6 is a block diagram of a speaker authentication system according to an embodiment of the present invention. The embodiment will be described below in conjunction with the figure. For the parts identical to those of the previous embodiment, their descriptions will be omitted properly.

As shown in FIG. 6, a system for speaker authentication according to the present embodiment comprises an enrollment apparatus 400 which can be the apparatus for enrollment of speaker authentication described in the previous embodiment; and a verification apparatus 500 which can be the apparatus for verification of speaker authentication described in the previous embodiment. The reference template and the optimal feature subset generated by the enrollment apparatus 400 are transferred to the verification apparatus 500 through an arbitrary communication mode such as a network, an internal channel, a recording media such as a magnetic disk, etc. and so on.

It can be seen from the above description that the system for speaker authentication according to the present embodiment can: in the enrollment phase, select an optimal acoustic feature subset in the case that there exist no imposer database, and select an optimal feature set according to the characteristics of each speaker; and in the verification phase, can select an optimal feature set according to the characteristics of each speaker by using the optimal feature set selected in the enrollment phase. Therefore, the extracted features will be more discriminatory. The system achieves remarkable improvement. In addition, the reference template can also be compressed correspondingly, thus, the storage requirement for template is cut down. Meanwhile, the computation burden is also reduced.

It should be pointed out that the apparatus 400 for enrollment of speaker authentication, the apparatus 500 for verification of speaker authentication and their various constituent parts can be composed of dedicated circuits or chips, and can also be implemented by a computer's (processor's) executing a corresponding program.

While the method and apparatus for enrollment of speaker authentication, the method and apparatus for verification of speaker authentication according to the present invention are detailed with reference to some exemplary embodiments, these embodiments are not exhaustive, and a person skilled in the art can make various changes and modifications within the spirit and scope of the present invention. Therefore, the according to an embodiment of the present invention is not limited to these embodiments, and the scope of the present invention is defined by the attached claims.

What is claimed is:

1. A method for enrollment of speaker authentication, comprising:
    generating a plurality of acoustic feature vector sequences respectively based on a plurality of utterances of the same content spoken by a speaker;
    generating a reference template from said plurality of acoustic feature vector sequences;
    generating a corresponding pseudo-impostor feature vector sequence for each of said plurality of acoustic feature vector sequences based on a code book that includes a plurality of codes and their corresponding feature vectors; and
    selecting an optimal acoustic feature subset based on said plurality of acoustic feature vector sequences, said reference template and said plurality of pseudo-impostor feature vector sequences.

2. The method for enrollment of speaker authentication according to claim 1, wherein said step of generating a corresponding pseudo-impostor feature vector sequence for each of said plurality of acoustic feature vector sequences comprises:
    designating a code to each feature vector in said acoustic feature vector sequence, to translate said acoustic feature vector sequence into a corresponding code sequence; and
    translating said code sequence into a corresponding feature vector sequence based on the codes and their corresponding feature vectors, as the pseudo-impostor feature vector sequence.

3. The method for enrollment of speaker authentication according to claim 2, wherein said step of designating a code to each feature vector in said acoustic feature vector sequence comprises:
    searching the code book for a feature vector closest to said feature vector of said acoustic feature vector sequence; and
    designating a code corresponding to the closest feature vector in the code book to said feature vector of said acoustic feature vector sequence.

4. The method for enrollment of speaker authentication according to claim 1, wherein said step of selecting a optimal acoustic feature subset comprises:
    traversing each possible acoustic feature subset; and
    selecting the acoustic feature subset that maximizes the discriminative rate of said reference template relative to said pseudo-impostor feature vector sequence as said optimal acoustic feature subset.

5. The method for enrollment of speaker authentication according to claim 1, wherein said step of selecting a optimal acoustic feature subset comprises:
    traversing each possible acoustic feature subset;
    calculating a plurality of DTW distances de(i) between the reference template and said plurality of acoustic feature vector sequences, and a plurality of DTW distances dp(i) between the reference template and said plurality of pseudo-impostor feature vector sequences respectively; and
    selecting the acoustic feature subset that minimizes the ratio of said plurality of DTW distances de(i) to said plurality of DTW distances dp(i) as said optimal acoustic feature subset.

6. The method for enrollment of speaker authentication according to claim 1, wherein said step of selecting a optimal acoustic feature subset comprises:
    traversing each possible acoustic feature subset;
    calculating a plurality of DTW distances de(i) between the reference template and said plurality of acoustic feature vector sequences, and a plurality of DTW distances dp(i) between the reference template and said plurality of pseudo-impostor feature vector sequences respectively; and
    selecting the acoustic feature subset that minimizes the ratio of the difference between said plurality of DTW distances de(i) and said plurality of DTW distances dp(i) to the sum of said plurality of DTW distances de(i) and said plurality of DTW distances dp(i) as said optimal acoustic feature subset.

7. The method for enrollment of speaker authentication according to any one of claims 4-6, wherein said step of traversing each possible acoustic feature subset is performed in a specific range.

8. The method for enrollment of speaker authentication according to claim 7, wherein said specific range includes possible acoustic feature subsets in which the number of acoustic features is greater than a specific number.

9. The method for enrollment of speaker authentication according to claim 1, further comprising:
    compressing the dimension of acoustic feature vectors in said reference template based on said optimal acoustic feature subset.

10. The method for enrollment of speaker authentication according to claim 1, further comprising:
    compressing the number of acoustic feature vectors in said reference template based on said code book.

11. An apparatus for enrollment of speaker authentication, comprising:
    an acoustic feature extracting unit configured to generate a acoustic feature vector sequence from an utterance spoken by a speaker;
    a template generating unit configured to generate a reference template from a plurality of acoustic feature vector sequences corresponding to a plurality of utterances of the same content spoken by a speaker;
    a pseudo-impostor data generating unit configured to generate a corresponding pseudo-impostor feature vector sequence for each of said plurality of acoustic feature vector sequences based on a code book that includes a plurality of codes and their corresponding feature vectors; and an optimizing unit configured to select an optimal acoustic feature subset based on said plurality of acoustic feature vector sequences, said reference template and said plurality of pseudo-impostor feature vector sequences.

12. The apparatus for enrollment of speaker authentication according to claim 11, wherein said pseudo-impostor data generating unit comprises:

a vector-code translating unit configured to designate a code to each feature vector in said acoustic feature vector sequence, to translate said acoustic feature vector sequence into a corresponding code sequence; and a code-vector translating unit configured to translate said code sequence into a corresponding feature vector sequence based on the codes and their corresponding feature vectors, as the pseudo-impostor feature vector sequence.

13. The apparatus for enrollment of speaker authentication according to claim 12, wherein said vector-code translating unit is configured to search the code book for a feature vector closest to said feature vector of said acoustic feature vector sequence, and designate a code corresponding to the closest feature vector in the code book to said feature vector of said acoustic feature vector sequence.

14. The apparatus for enrollment of speaker authentication according to claim 11, wherein said optimizing unit is configured to traverse each possible acoustic feature subset, and select the acoustic feature subset that maximizes the discriminative rate of said reference template relative to said pseudo-impostor feature vector sequence as said optimal acoustic feature subset.

15. The apparatus for enrollment of speaker authentication according to claim 11, wherein said optimizing unit is configured to traverse each possible acoustic feature subset; calculate a plurality of DTW distances de(i) between the reference template and said plurality of acoustic feature vector sequences, and a plurality of DTW distances dp(i) between the reference template and said plurality of pseudo-impostor feature vector sequences respectively; and select the acoustic feature subset that minimizes the ratio of said plurality of DTW distances de(i) to said plurality of DTW distances dp(i) as said optimal acoustic feature subset.

16. The apparatus for enrollment of speaker authentication according to claim 11, wherein said optimizing unit is configured to traverse each possible acoustic feature subset; calculate a plurality of DTW distances de(i) between the reference template and said plurality of acoustic feature vector sequences, and a plurality of DTW distances dp(i) between the reference template and said plurality of pseudo-impostor feature vector sequences respectively; and select the acoustic feature subset that minimizes the ratio of the difference between said plurality of DTW distances de(i) and said plurality of DTW distances dp(i) to the sum of said plurality of DTW distances de(i) and said plurality of DTW distances dp(i) as said optimal acoustic feature subset.

17. The apparatus for enrollment of speaker authentication according to any one of claims 14-16, wherein said optimizing unit is configured to traverse each possible acoustic feature subset in a specific range.

18. The apparatus for enrollment of speaker authentication according to claim 17, wherein said specific range includes possible acoustic feature subsets in which the number of acoustic features is greater than a specific number.

19. The apparatus for enrollment of speaker authentication according to claim 11, further comprising:

a compressing unit configured to compress the dimension of acoustic feature vectors in said reference template based on said optimal acoustic feature subset.

20. The apparatus for enrollment of speaker authentication according to claim 11, further comprising:

a compressing unit configured to compress the number of acoustic feature vectors in said reference template based on said code book.

* * * * *